United States Patent [19]

Isaka et al.

[11] Patent Number: 5,045,869
[45] Date of Patent: Sep. 3, 1991

[54] PRINTING CONTROLLER FOR PRINTING AT SELECTED RESOLUTIONS

[75] Inventors: Yukio Isaka, Yokohama; Tetsuya Morita, Kawasaki; Hiroshi Yamano, Yokohama; Masahiko Murata, Tama; Masahiko Sakai, Kawasaki, all of Japan

[73] Assignee: Canon Kabushiki Kaisha, Tokyo, Japan

[21] Appl. No.: 407,311

[22] Filed: Sep. 14, 1989

[30] Foreign Application Priority Data

Sep. 16, 1988 [JP] Japan .................................. 63-229729
Dec. 28, 1988 [JP] Japan .................................. 63-329137
Jan. 13, 1989 [JP] Japan .................................. 1-004721
Jan. 27, 1989 [JP] Japan .................................. 1-016370

[51] Int. Cl.⁵ ........................... G01D 9/42; H04N 1/21
[52] U.S. Cl. ..................................... 346/108; 358/296
[58] Field of Search ................... 346/108, 107 R, 160; 358/296, 300, 302

[56] References Cited

U.S. PATENT DOCUMENTS

| | | | |
|---|---|---|---|
| 4,059,833 | 11/1977 | Kitamura et al. | 346/108 |
| 4,107,786 | 8/1978 | Masaki et al. | 346/900 |
| 4,124,871 | 11/1978 | Morrin | 358/77 |
| 4,231,096 | 10/1980 | Hansen et al. | 364/900 |
| 4,345,245 | 8/1982 | Vella et al. | 364/900 |
| 4,393,387 | 7/1983 | Kitamura | 346/108 |
| 4,686,525 | 8/1987 | Nagata | 400/171 |
| 4,715,006 | 12/1987 | Nagata | 364/523 |

Primary Examiner—Mark J. Reinhart
Attorney, Agent, or Firm—Fitzpatrick, Cella, Harper & Scinto

[57] ABSTRACT

Printing is performed with the higher one of the two resolutions designated for text data and image data if these resolutions are different from each other. If in this case the resolution designated for the text data is changed, character patterns based the an optimum number of constituent dots are selected for printing of characters of the designated size in accordance with the text data. If the resolution of the image data is changed, the image data is interpolated.

26 Claims, 15 Drawing Sheets

| D | R | f | CHARACTER SIZE A | CHARACTER SIZE B |
|---|---|---|---|---|
| $D_1$ | $R_1$ | $f_1$ | $S_{11}$ | $S_{21}$ |
| $D_2$ | $R_2$ | $f_2$ | $S_{12}$ | $S_{22}$ |
| $D_3$ | $R_3$ | $f_3$ | $S_{13}$ | $S_{23}$ |
| ⋮ | ⋮ | ⋮ | ⋮ | ⋮ |
| $D_N$ | $R_N$ | $f_N$ | $S_{1N}$ | $S_{2N}$ |

FIG. 3

PRINTING CONTROLLER FOR PRINTING AT SELECTED RESOLUTIONS

BACKGROUND OF THE INVENTION

This invention relates to a printing controller and, more particularly, to a controller for controlling a printer capable of changing the resolution.

A type of printer called a page printer has been put to practical use which printer analyzes and records printing information received from a host computer or the like as groups of data items for respective pages to be printed.

This type of printer is designed to print with accuracy and with improved resolution in accordance with printing information on a combination of characters and images formed by image editing using a desktop publishing system recently developed.

A type of printer for printing texts has also been put to practical use, said printer has an internal memory for storing data on character patterns based on different numbers of constituent dots and is capable of printing characters of different sizes on the basis of input control commands.

On the other hand, image scanners having a resolution of, for example, 400 dpi (dots per inch) higher than that of ordinary printers have recently been put to practical use, although the production cost is high.

However, if image data obtained by such a high-resolution image scanner is input into a printer having a lower resolution, it is necessary to thin out the image data so that the image data becomes matched with the resolution determined by text data which is to be used in combination with the image data. The qualities of the printed image are thereby reduced although the original image data is obtained by reading with higher resolution.

Conversely, if an image read by an image scanner having a lower resolution is printed by mixing in text data, the qualities of the whole of the printed page are reduced.

Ordinarily, printing data received from a host computer or the like contains a command which designates the size of characters (text data) to be printed, e.g., 12, 10 or 6 points. For this reason, conventional printers entail another problem in that, in the case of printing of characters having a smaller size, font patterns based on a smaller number of constituent dots are used and the characters are necessarily deformed, resulting in a reduction in the qualities of the print.

SUMMARY OF THE INVENTION

An object of the present invention is to improve printing controller for controlling a printer capable of changing the resolution.

Another object of the present invention is to provide a printing controller which enables production of a high quality reproduced image.

Still another object of the present invention is to provide a printing controller which is simple in construction and enables outputting of a high quality image.

Still another object of the present invention is to provide a printing controller which can overcome the above described problems.

Another object of the present invention is to provide a printing controller which enables formation of an output image having high qualities even if the resolution designated for image data is higher than that for text data when the image is formed on the basis of printing information consisting of the mixture of the image data and the text data.

To attain these objects, the present invention provides a printing controller for controlling a printer capable of changing the resolution, having: an input means for inputting printing information containing at least a character symbol code, image data and printing control information; a pattern generating means for generating character symbol patterns based on different numbers of constituent dots; a control means for making the pattern generating means generate a character symbol pattern in accordance with the character symbol code on the basis of the resolution of the image data if the resolution of the image data input through the input means is higher than the resolution of the character symbol code; a resolution setting means for setting the printer to effect printing with the resolution of the image data; and an output means for outputting the character symbol pattern generated by the pattern generating means under the control of the control means and the image data input through the input means to the printer set by the resolution setting means.

Still another object of the present invention is to provide a printing controller which enables formation of an output image having high qualities even if the resolution designated for image data is lower than that for text data when the image is formed on the basis of printing information consisting of the mixture of the image data and the text data.

To attain this object, the present invention provides a printing controller for controlling a printer capable of changing the resolution, having: an input means for inputting printing information containing at least a character symbol code, image data and printing control information; a pattern generating means for generating character symbol patterns based on different numbers of constituent dots; an interpolation means for interpolating the image data on the basis of the resolution designated for the image data and the resolution of the character symbol code if the resolution of the image data input through the input means is lower than the resolution of the character symbol code; a resolution setting means for setting the printer to effect printing with the resolution designated for the character symbol code; and an output means for outputting the image data interpolated by the interpolation means and the character symbol pattern generated by the pattern generating means to the printer set by the resolution setting means.

A further object of the present invention is to provide a printing controller which enables formation of an output image having high qualities even if the resolutions designated for image data and text data are different from each other when the image is formed on the basis of printing information consisting of the mixture of the image data and the text data.

To attain this object, the present invention provides a printing controller for controlling a printer capable of changing the resolution, having: an input means for inputting printing information containing at least a character symbol code, image data and printing control information; a pattern generating means for generating character symbol patterns based on different numbers of constituent dots; a comparison means for comparing the resolution designated for the image data input through the input means with the resolution of the character symbol code; a control means for making the pattern generating means generate a character symbol pattern in accordance with the character symbol code on the basis of the resolution of the image data; an interpolation means for interpolating the image data on the basis of the resolution designated for the image data and the resolution of the character symbol code; a resolution setting means for setting the resolution of the printer in accordance with the resolution recognized by the comparison means to be higher; a first output means for outputting the image data input through the input means and the character symbol pattern generated under the control of the control means to the printer in which the resolution is set by the resolution setting means; a second output means for outputting the character symbol pattern generated by the pattern generating means and the image data interpolated by the interpolation means to the printer in which the resolution is set by the resolution setting means; and an urging means for urging one of the first and second output means on the basis of the result of comparison effected by the comparison means.

A still further object of the present invention is to provide a printing controller which enables formation of an output image having high qualities without any considerable deformation even if the size of the character is small.

To attain this object, the present invention provides a printing controller for controlling a printer capable of changing the resolution, having: an input means for inputting at least a character code; a pattern generating means for generating character symbol patterns based on different numbers of constituent dots; a resolution changing means for increasing the resolution of the printer if the size designated for the character symbol code input through the input means is recognized to be equal to or smaller than a predetermined size; a control means for making the pattern generating means generate a character symbol pattern based on the number of constituent dots according to the resolution changed by the resolution changing means and the designated size; and an output means for outputting the character symbol pattern generated by the pattern generating means under the control of the control means to the printer.

Further objects, features and advantages of the present invention will become apparent from the following description based on the accompanying drawings and the claims appended hereto.

BRIEF DESCRIPTION OF THE DRAWINGS

FIG. 3 is a table showing the relationship between degrees of resolutions and the numbers of constituent dots in the character patterns for obtaining designated character sizes;

DESCRIPTION OF THE PREFERRED EMBODIMENTS

Embodiments of the present invention will be described below in detail with reference to the accompanying drawings.

Figure 1:
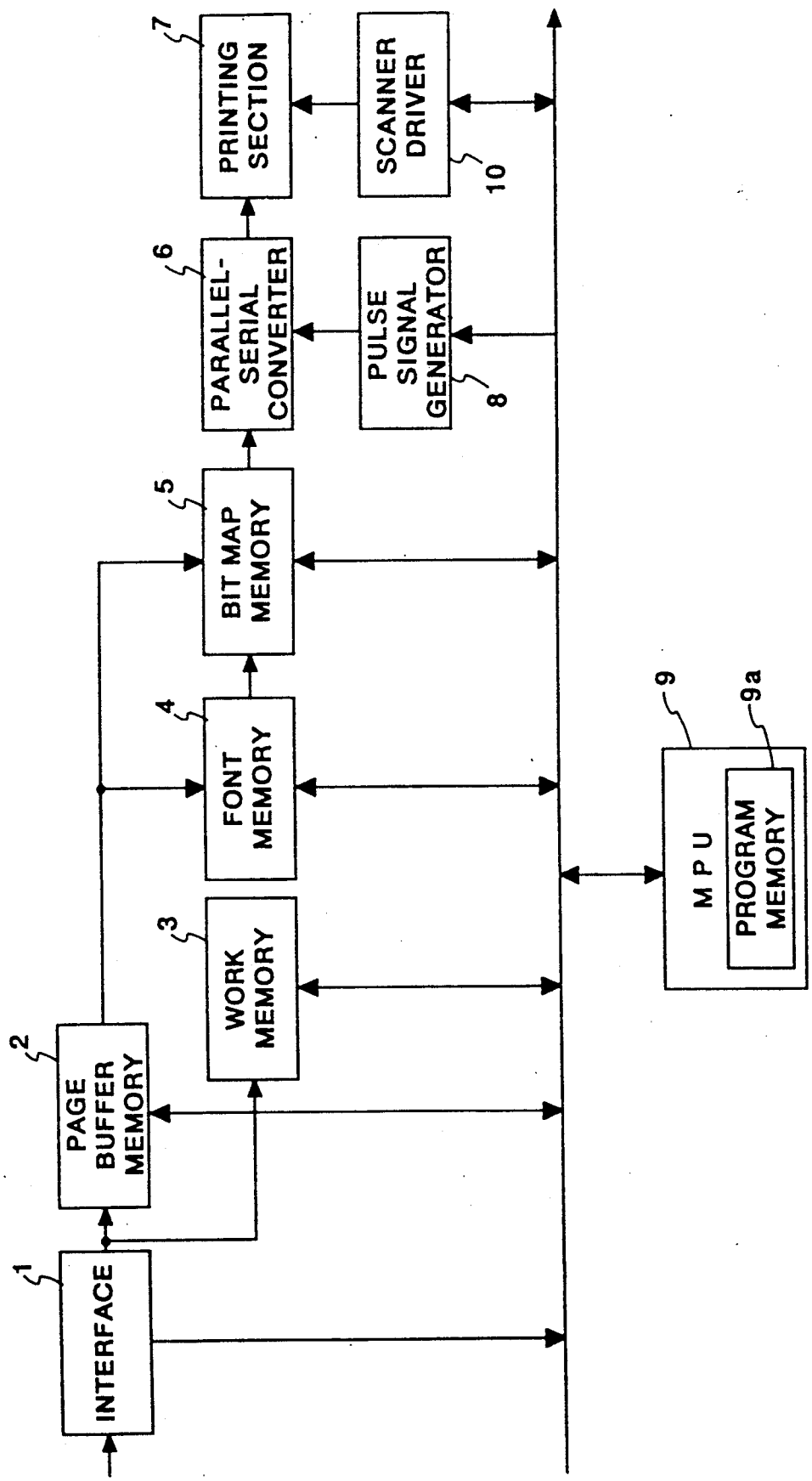
FIG. 1 is a block diagram of the construction of a printer according to the present invention.

FIG. 1 shows a block diagram of the construction of a printer according to an embodiment of the present invention.

The printer receives through an interface section 1 printing information processed by a host computer or the like (not shown), i.e., image data, text data, printing control parameters and so on. The printing control parameters comprise codes for designating resolutions, character sizes and type styles (such as courier and the like) of the text data, as well as codes for designating dots for the image data. A page buffer memory 2 stores printing information received through the interface 1 and edits pages while analyzing codes. A work memory 3 stores various control parameters for printing effected by a printing section 7. A font memory 4 contains character patterns consisting of different numbers of dots, e.g., 40×40, 24×24, etc., for respective fonts. A bit map memory 5 stores dot image data to be transmitted to the printing section 7. A parallel-serial converter 6 converts parallel data read out of the bit map memory 5 into serial data and successively transmits items of converted data to the printing section 7. A pulse signal generator 8 generates an image clock having a frequency corresponding to a set resolution and outputs the clock to the parallel-serial converter 6. The parallel-serial converter 6 reads 1 byte of data from the bit map memory 5 each time it receives eight pulses of the image clock. The parallel-serial converter 6 shifts the data read in synchronization with the image clock to convert this data into serial data, and transmits the serial data to the printing section 7. In this embodiment, the printing resolution in the main scanning direction can be changed by selecting the frequency of the image clock generated by the pulse signal generator 8. An MPU 9 effect overall control of page variables and printing processes in accordance with a control program stored in an internal program memory 9a. A scanner driver 10 drives a scanner motor (mentioned later) for scanning a laser beam in accordance with this embodiment while selecting the rotational speed of the scanner motor according to the resolution set by the MPU 9.

The operation of the MPU 9, which will be explained later, includes a process of comparing and discriminating the resolutions designated for the text data and the image data supplied form the host computer, and a process of setting the resolution of printing effected by the printing section 7. These components, excluding the printing section 7, constitute the printing controller in accordance with the present invention.

Figure 2:
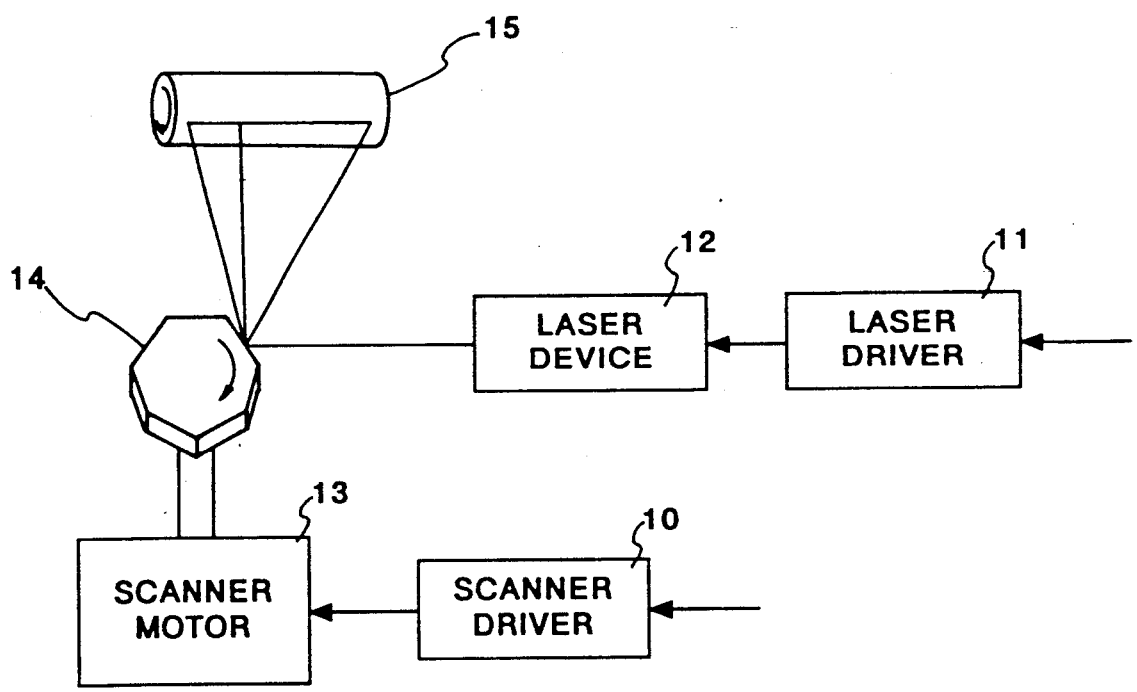
FIG. 2 is a diagram of the construction of a printing section.

FIG. 2 shows the construction of the printing section 7. In this embodiment, the printing section 7 comprises a laser beam printer which forms an image by exposing a sensitized member (photosensitive drum) to a laser beam while scanning the laser beam.

Referring to FIG. 2, a laser driver 11 turns on and off a laser device 12, i.e., makes the laser device 12 give off laser light or stop giving off laser light according to an image signal (video signal) supplied from the parallel-serial converter 6. A scanner motor 13 for rotating a polygon mirror 14 rotates its shaft at a rotational speed corresponding to a value set by the scanner driver 10. A photosensitive drum 15 is rotated by a driving motor (not shown) at a constant speed in the direction of the arrow. The laser beam reflected by a side surface of the polygon mirror 14 is swept in the axial direction of the photosensitive drum 15, and an electrostatic latent image is formed on the surface of the photosensitive drum 15 as a result of exposure using the laser beam. Thereafter, the image is formed on a recording sheet on the basis of a well-known electrophotography process.

Next, the operation of the printing section 7 shown in FIG. 2 will be described below.

The scanner driver 10 receives, from the MPU 9 of the printing controlling section, data which designates a rotational speed of the scanner motor 13, makes the scanner motor 13 rotate in accordance with this data, and maintains the selected rotational speed.

The laser driver 11 is supplied with the image signal (video signal) from the parallel-serial converter 6 and turns on and off the laser device 12. The laser beam from the laser device 12 is reflected by the side surface of the polygon mirror 14 and is thereby made to scan over the photosensitive drum 15. An electrostatic latent image is formed on the photosensitive drum 15 in accordance with on/off states of the laser beam, thereby enabling printing.

In this embodiment, the rotational speed of the photosensitive drum 15 is constant. The change in the resolution (dot density) in the direction of the sub. scanning direction is therefore determined by the rotational speed R of the scanner motor 13. The resolution in the main scanning direction is determined by the frequency f of the image signal (frequency of image clock) input into the laser driver 11 after the rotational speed of the scanner motor 13 has been determined.

For instance, to obtain a printing resolution twice as high as the ordinary resolution, it is necessary to double the number of laser beam scanning lines per unit length. The rotational speed of the scanner motor 13 is accordingly doubled. However, the resolution in the main scanning direction is reduced by half if only the rotational speed of the polygon mirror 14 is doubled. It is therefore necessary to quadruple the frequency of the image signal output from the parallel-serial converter 6. To do so, the frequency of the image clock generated by the pulse generator 8 may be quadrupled. Incidentally, the resolution is set to 240 dpi when the power supply is turned on or in a case where the resolution is not designated (in the case of default).

Thus, a selected resolution can be achieved by changing both the rotational speed of the scanner motor 13 (polygon mirror 14) and the frequency of the image signal. If the resolution is D, the rotational speed of the scanner motor 13 R, and the frequency of the image clock f, rotational speeds and frequencies of the image clock with respect to possible resolutions $D_1$ to $D_N$ are defined as $R_1$ to $R_N$ and $f_1$ to $f_N$.

Thus, the resolution can be changed by controlling the frequency of the image clock and the rotational speed of the scanner motor.

To print characters having designated sizes with a determined resolution, it is necessary to consider the selection of character patterns based on different numbers of constituent dots.

In a case where characters of 12 points and 6 points are printed with a printer having a resolution of 240 dpi, the printer needs to have character patterns based on $40 \times 40$ constituent dots and character patterns based on $20 \times 20$ constituent dots.

In the case of printing with a resolution of 300 dpi, a character of 12 points is printed by using a character pattern based on $50 \times 50$ constituent dots while a character of 6 points is printed by using a character pattern based on $25 \times 25$ constituent dots.

The resolution D for printing of a character of 6 points using a character pattern based on $40 \times 40$ constituent dots can be calculated by the following equation:

$$\frac{25.4 \text{ mm}}{72} \times 6 \times \frac{D}{25.4 \text{ mm}} = 40$$

That is, the resolution D is 480 (dpi). The 25.4/72 indicates the size per point (unit: mm).

FIG. 3 shows the relationship between the resolution and the numbers of constituent dots for printing with character sizes A and B. It is indicated that, in the case of printing with resolution $D_2$, the scanner motor 13 may be rotated at rotational speed $R_2$ while the frequency of the image clock is set to $f_2$. It is also indicated that for printing of a character of character size A with resolution $D_2$, a character pattern based on the number of constituent dots $S_{12}$ may be generated by the font memory 4 and developed in the bit map memory 5. Similarly, for printing of a character of character size B, a character pattern based on the number of constituent dots $S_{22}$ may be generated.

The table shown in FIG. 3 may be stored in the program memory 9a of the MPU 9. The character sizes available for printing are not limited to the two sizes shown in the table. However, the font memory 4 must have a very large capacity if the variety of character patterns based on different constituent dots are increased. In this case, a system of generating character patterns on the basis of a coordinate type data may be adopted. Characters formed by this system are ordinarily called outline fonts. This system enables generation of character patterns based on different constituent dots from common coordinate data and is therefore advantageous in terms of memory capacity as well as qualities of generated character patterns.

Figure 4A:
FIG. 4A is a format of received printing data.

FIG. 4A shows a format of printing data output from the host computer.

In the printer in accordance with the embodiment, the existence of an escape code is examined to identify control information (printing parameter).

In FIG. 4A, <ESC> designates an escape code which indicates that the subsequent data is control data. The end of control data can be discriminated by detecting ";" placed at the end of the control data. Various control data items can be inserted between the escape code and ";". A control data item "Dxx" signifies that the resolution for the subsequent data is set to "xx", and "Sxx" signifies that characters based on the number of points represented by "xx" will be printed. A control data item "PXoYo" signifies that the sheet position at which printing on the recording sheet is set to coordinate (Xo, Yo), and "IWoHo" signifies that the width and the height of the area of image data are set to Wo and Ho, respectively.

"123 . . . ABC . . . DE", subsequent to ";" indicating the end of control information designates text data, while "00 01 ..." designates dot information provided as image data.

Figure 4B:
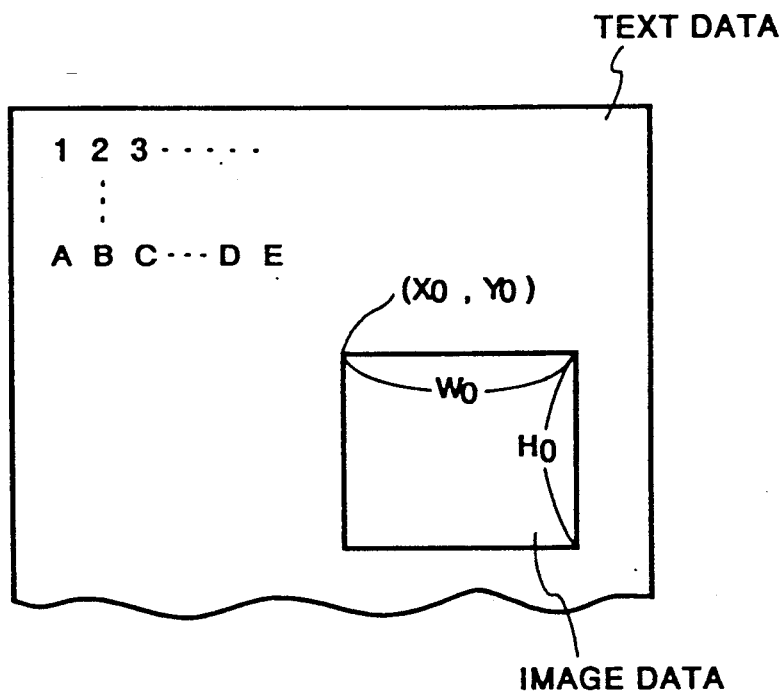
FIG. 4B is a diagram for explanation of the data shown in FIG. 4A.

An output image such as that shown in FIG. 4B is obtained from this received data.

To change the character size in the middle of the sequence of text data items, the escape code, control data for designating the character size and ";" indicating the end of the control information may be inserted at the changing position. The control information may designate other factors including line pitches, character pitches, and character styles. However, in accordance with the present invention, these examples are not limitative. In this embodiment, control information is provided as escape sequences, but the present invention is not limited to this data structure. What is essential is to enable discrimination of text data, image data and data for controlling printing.

The operation of a process of setting the resolution for a particular page on the basis of the above described principle will be described below.

First, a case where the resolution designated for input image data is higher than that for text data will be described below.

Data input from an exterior unit is stored in the page buffer memory 2 through the interface 1. The MPU 9 analyzes various items of control information contained in the input data, restructures the data as page data and stores the restructured data in the page buffer 2. Simultaneously, the MPU 9 stores the leading address of the restructured data at a predetermined position in the work memory 3, determines parameters including the rotational speed of the scanner motor 13 and the frequency of the image clock by referring to the table of FIG. 3 and stores the parameters in the work memory 3 with predetermined addresses.

If the input data contains image data and a command which designates a resolution for the image data, the resolution and other factors are stored in the work memory 3 so that the overall resolution of the page including the image is set to the resolution equal to the image resolution.

After data for one page has been restructured in the page buffer 2, the leading address of the data stored in the page buffer 2 is read out and data items are successively read from this address. Then, character patterns corresponding to the read out data are generated and are developed in the bit map memory 5. The number of constituent dots of the generated character patterns is selected from the table of FIG. 3 on the basis of the determined resolution and the designated character size. If the data read out of the page buffer 2 is not character codes but image data, the image data is directly developed in the bit map memory 5.

After the development of image data (including character patterns) for one page in the bit map memory 5 has been completed, the MPU 9 sets in the scanner driver 10 data for setting the rotational speed R of the scanner motor 13 corresponding to the determined resolution. Also, the MPU 9 also sets in the pulse generator 8 data for making the laser device turn on and off at the image clock frequency corresponding to the determined resolution.

The scanner driver 10 controls the scanner motor 13 so as to make the same rotate stably at the set rotational speed, and outputs a ready state signal to the MPU 9 if the maintenance of the rotation of the scanner motor 13 at the set speed is achieved. To detect the rotational speed of the scanner motor 13, it is sufficient to arrange in such a manner that a rotary encoder, for example, is fixed to the rotary shaft of the scanner motor 13, a light emitting element and a light receiving element are disposed on opposite sides of the rotary encoder, and time intervals of signals output from the light receiving element are examined.

When the MPU receives the ready state signal from the scanner driver 10, it reads data out of the bit map memory 5 and outputs the read out data to the parallel-serial converter 6. The parallel-serial converter 6 converts the parallel data into serial dot data by using the clock from the pulse generator 8 previously set, and outputs the converted data as a video signal to the laser driver 11.

If the MPU 9 has improved functions as well as a sufficient computing speed, it may receive information on printing of the next page from the external host computer in parallel with data transmission to the printing section, develop the received information in the page buffer 2, and develop the image data in the area of the bit map memory 5 from which the preceding data has already been output.

Figure 5A:
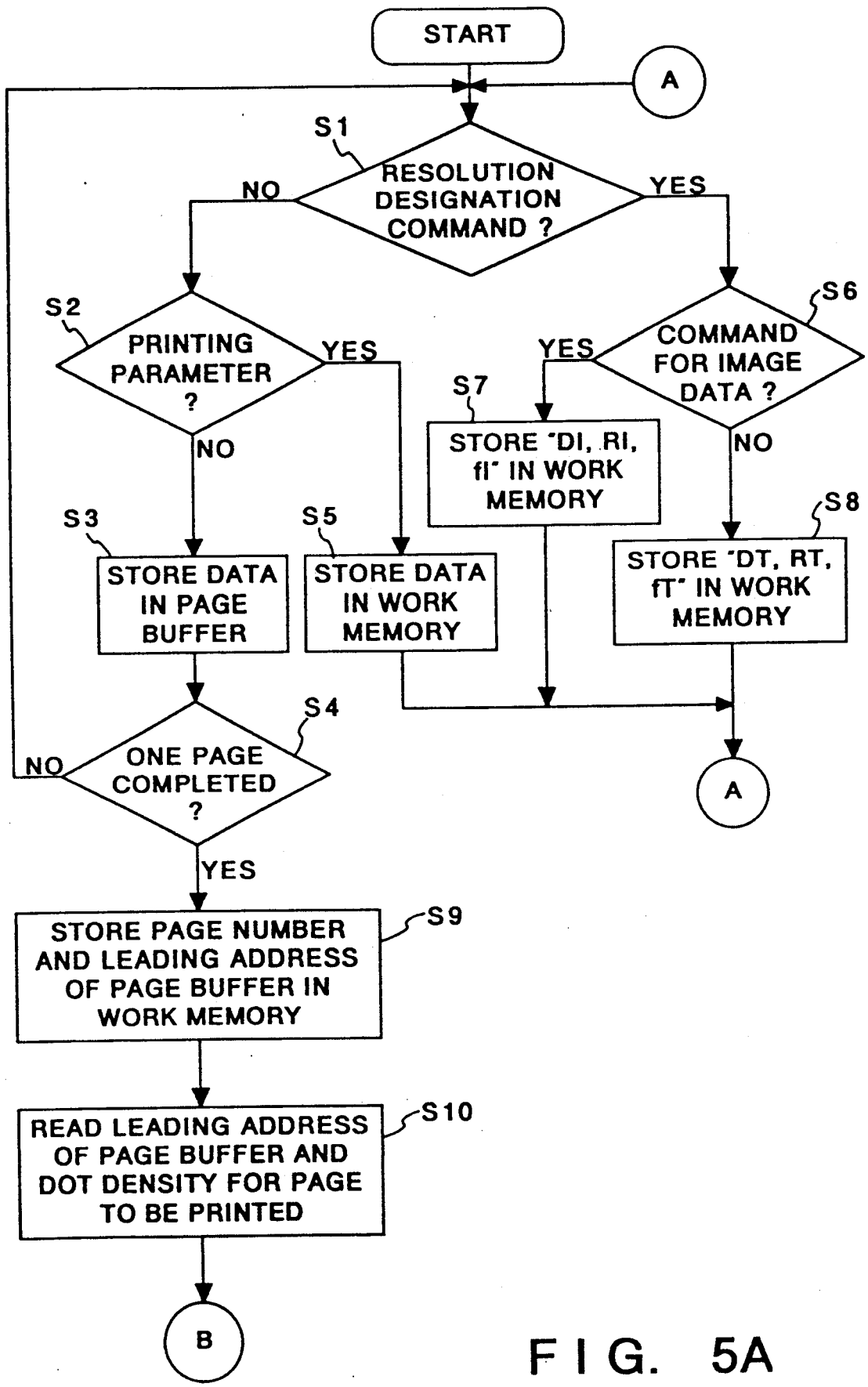
FIGS. 5A and 5B are flow charts of the procedure of a process conducted when the resolution designated for image data is higher than that for text data.
Figure 5B:
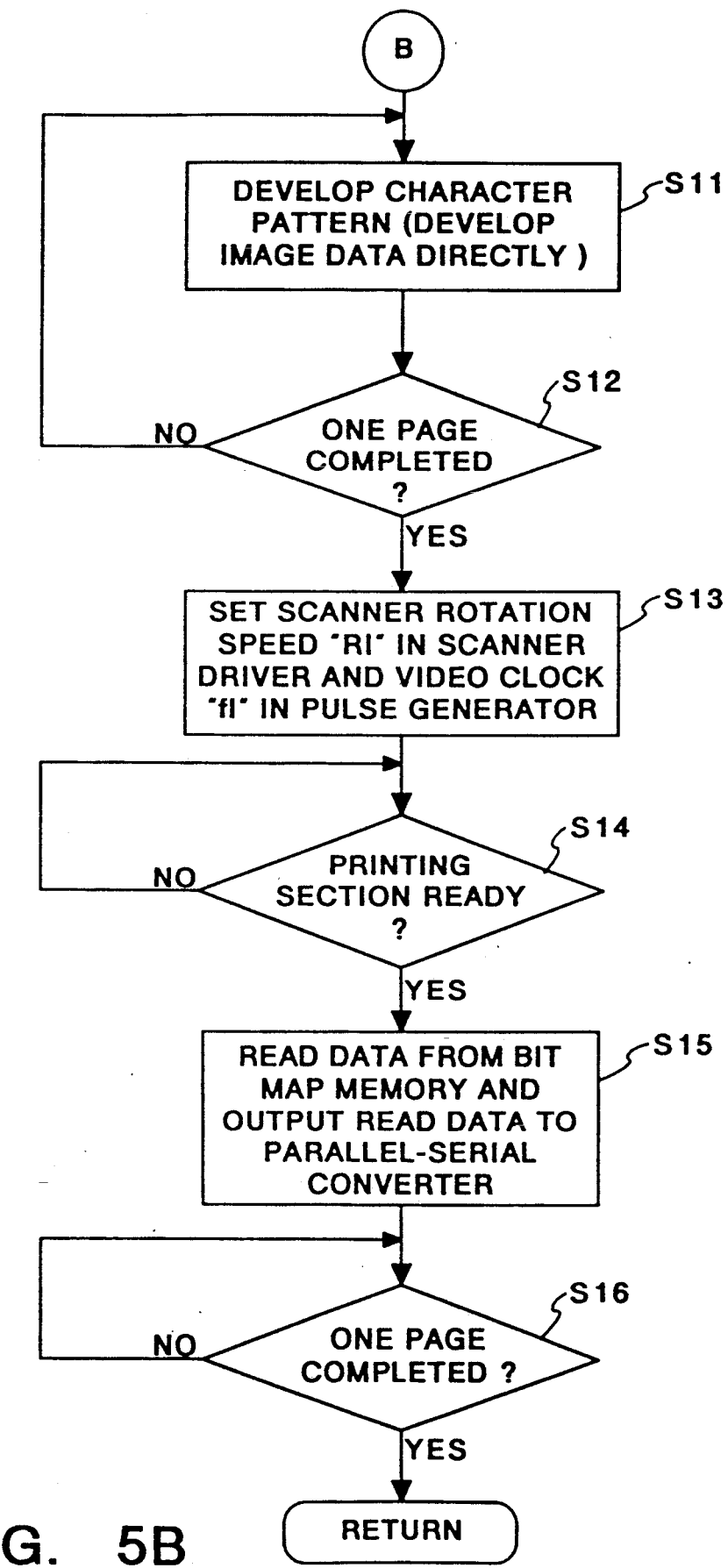

The procedure of the operating process will be described below on the basis of the flow charts of FIGS. 5A and 5B.

In step S1, determination is made as to whether or not a received data item is a resolution designation command. In the case of NO, the process proceeds to step S2 and determination is made as to whether or not the received data item is one of other printing parameters. In the case of NO, the process proceeds to step S3 and the data is successively stored in the page buffer 2. The part of the process corresponding to steps S1 to S3 is repeated until it is determined in step S4 that reception of printing information for one page is completed.

If the received data item is recognized as a printing parameter for setting other than the designation of resolution, it is stored in the work memory 5. If it is recognized as a resolution designation command, the process proceeds to step S6 and determination is made as to whether the command designates the resolution for image data or for text data. If the data item is a command for designating the resolution for image data, the designated resolution is set as a resolution DI of the present page. A rotational speed RI of the scanner motor 13 and a frequency fI of image clock thereby determined are written in the work memory 3.

If it is determined that the command does not designate the resolution for image data, the process proceeds to step S8 and a new table is made as a resolution DT for the present page. A rotational speed RT of the scanner motor 13 and a frequency fT of image clock are simultaneously stored in the work memory 3, and the process returns to step S1.

After data items for one page have been stored in the page buffer 2 in this way, the process proceeds to step S1, and the leading address of the printing information stored in the page buffer 2 and the page number are stored in the work memory 3. In step S10, the address information and the determined resolution stored in the work memory 3 are read out. Then, in step S11, data is taken from the position of the page buffer indicated by the read out address, character patterns for the read out data are read out of the font memory 4 and are developed in the bit map memory 5. Needless to say, the character patterns generated at this time are based on the number of constituent dots according to the determined resolution and the designated character size.

If the read out data is not determined as a character code but as image data, it is written in the bit map memory 5 without being used or processed. The above operations are repeated until it is determined in step S12 that the data development processing for one page is completed.

After the development of image data (including character patterns) for one page in the bit map memory 5 has been completed, the process proceeds to step S13 and the rotational speed RI of the scanner motor 13 for the determined resolution is set in the scanner driver 10 while the frequency fI of image clock is set in the pulse generator 8. Thereafter, in step S14, reception of the ready signal is waited which indicates that the polygon mirror 14 is rotating at the speed set by the scanner driver 10. After the ready signal has been received, image data items are successively read out of the bit map memory 5 and are converted into image signals which are output to the laser driver 11. At this time, needless to say, the recording sheet is transported to the photosensitive drum 15, and the photosensitive drum 15 is rotated at the predetermined speed.

The operation of outputting image signals thus conducted is repeated until the completion of the printing output for one page is determined in step S16.

The process described above enables a high quality output without thinning out image data in the printing data supplied from the host computer even if the resolution of the image data is higher than that of text data.

Next, a case where the resolution of text data is higher than that of image data will be described below.

If in this case the same process as the above described process is conducted, the resolution of text data must be reduced. Character patterns based on a smaller number of constituent dots are accordingly used for printing, resulting in a deterioration in the character qualities. In this embodiment, this problem is solved as described below.

That is, in such a case, the resolution of the corresponding page is set to the resolution designated for text data when the page is printed. For instance, in a case where the resolution designated for image data is 200 dpi while the resolution designated for text data is 400 dpi, the overall resolution of the page is set to 400 dpi for printing. However, if printing is performed by simply adopting this setting, the intervals of dots in the longitudinal direction and in the transverse direction are respectively reduced by half, and the two dimensions of the resulting printed image are ¼ the originally intended dimensions. To avoid this problem, in this embodiment, interpolation is effected for image data. More specifically, blocks each consisting of 2×2 dots are generated from the dot information before interpolation, thereby enabling at least printing of the image of the intended size.

Figure 6A:
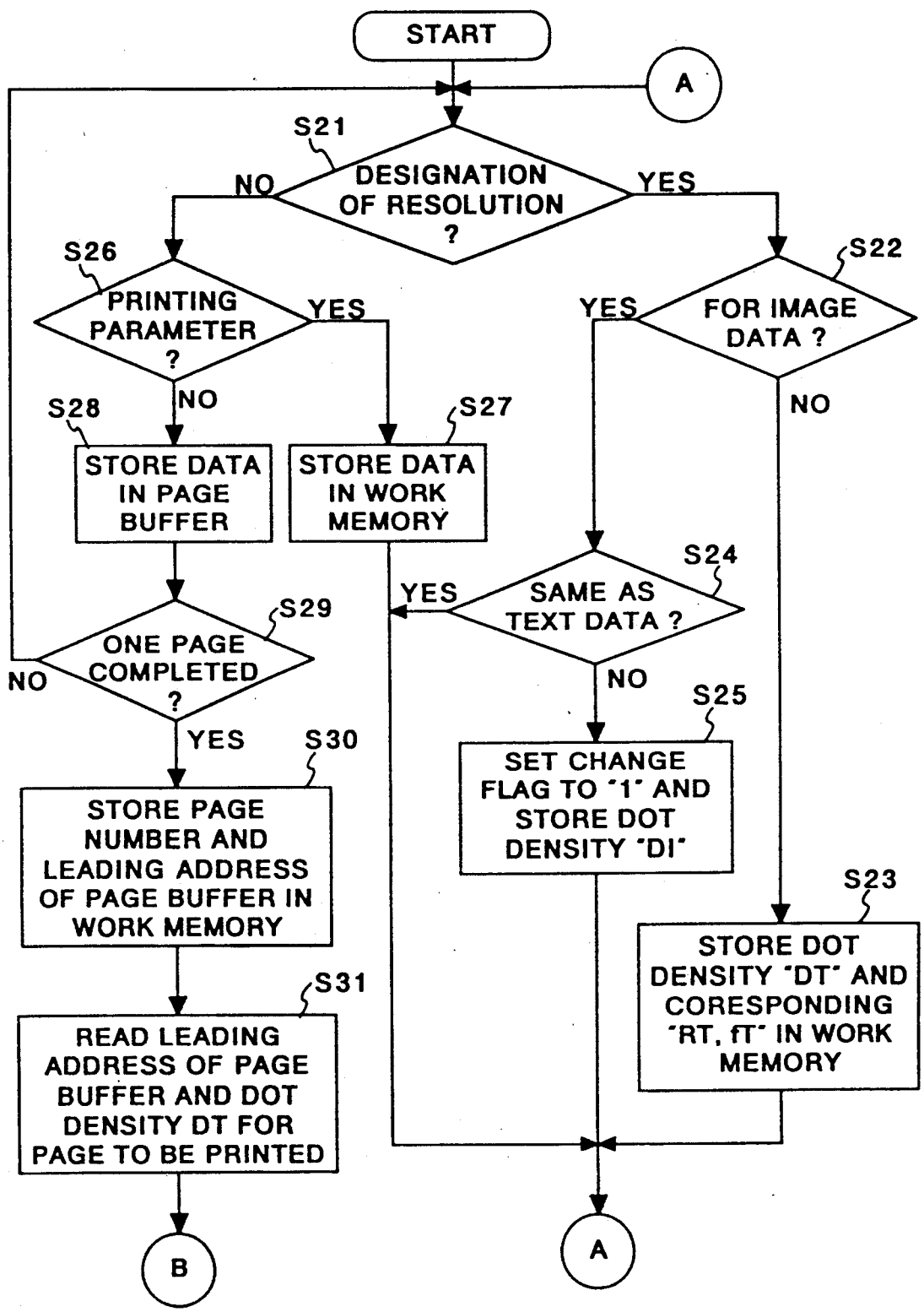
FIGS. 6A to 6C are flow charts of the procedure of a process conducted when the resolution designated for image data is lower than that for text data.
Figure 6B:
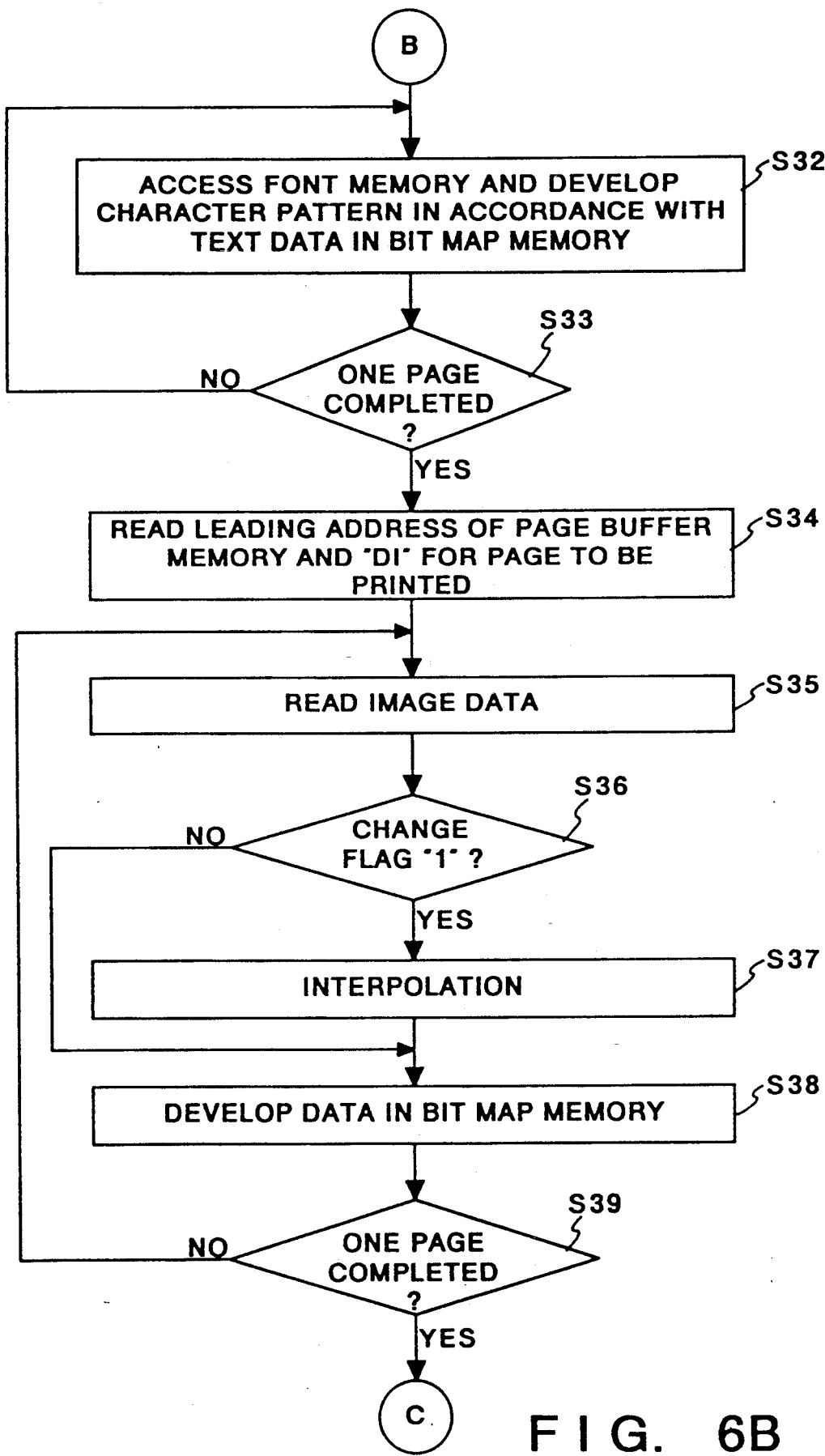
Figure 6C:
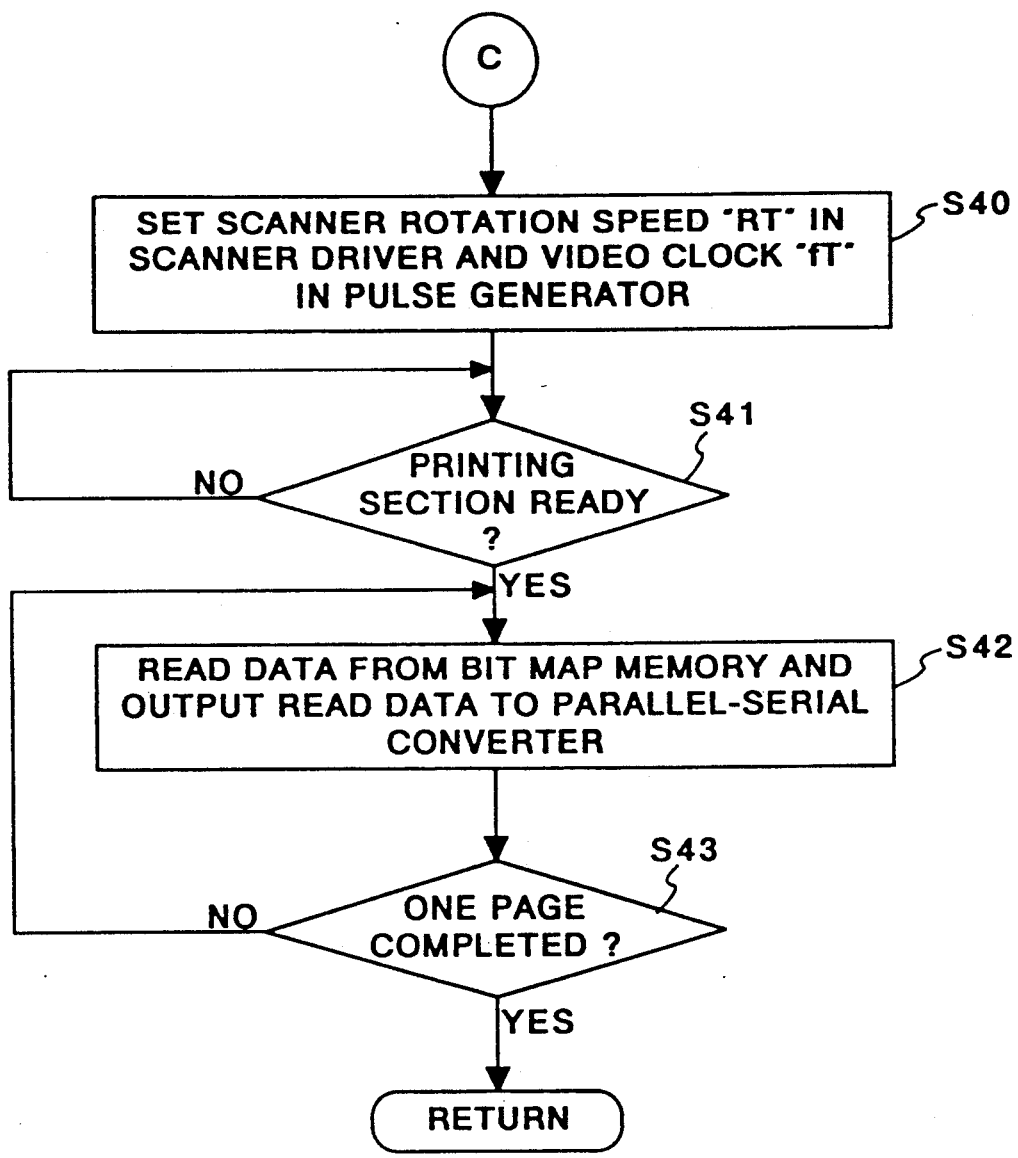
Figure 7A:
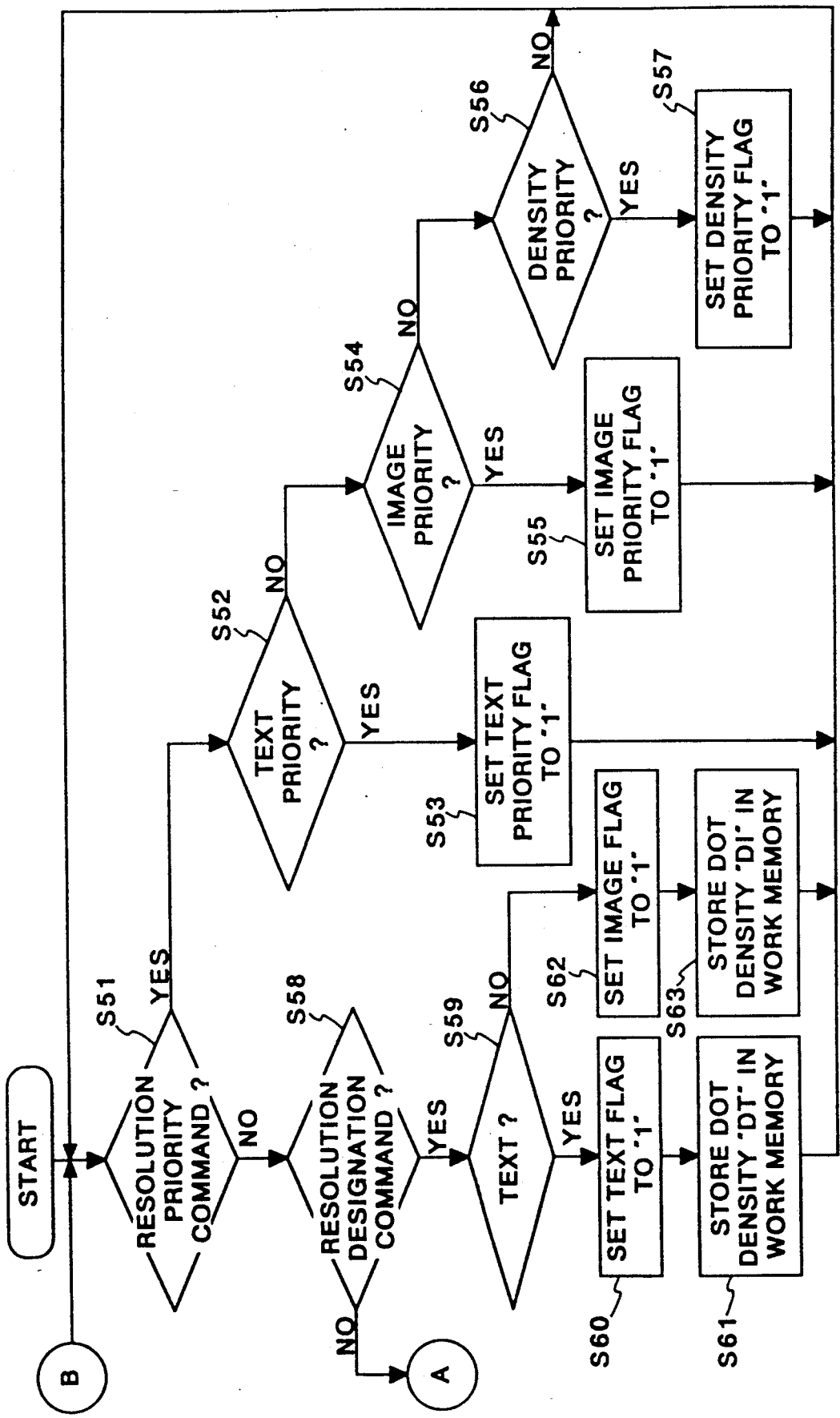
FIGS. 7A to 7D are flow charts of the procedure of a process for obtaining good results of printing irrespective of the resolutions designated for image data and text data.
Figure 7B:
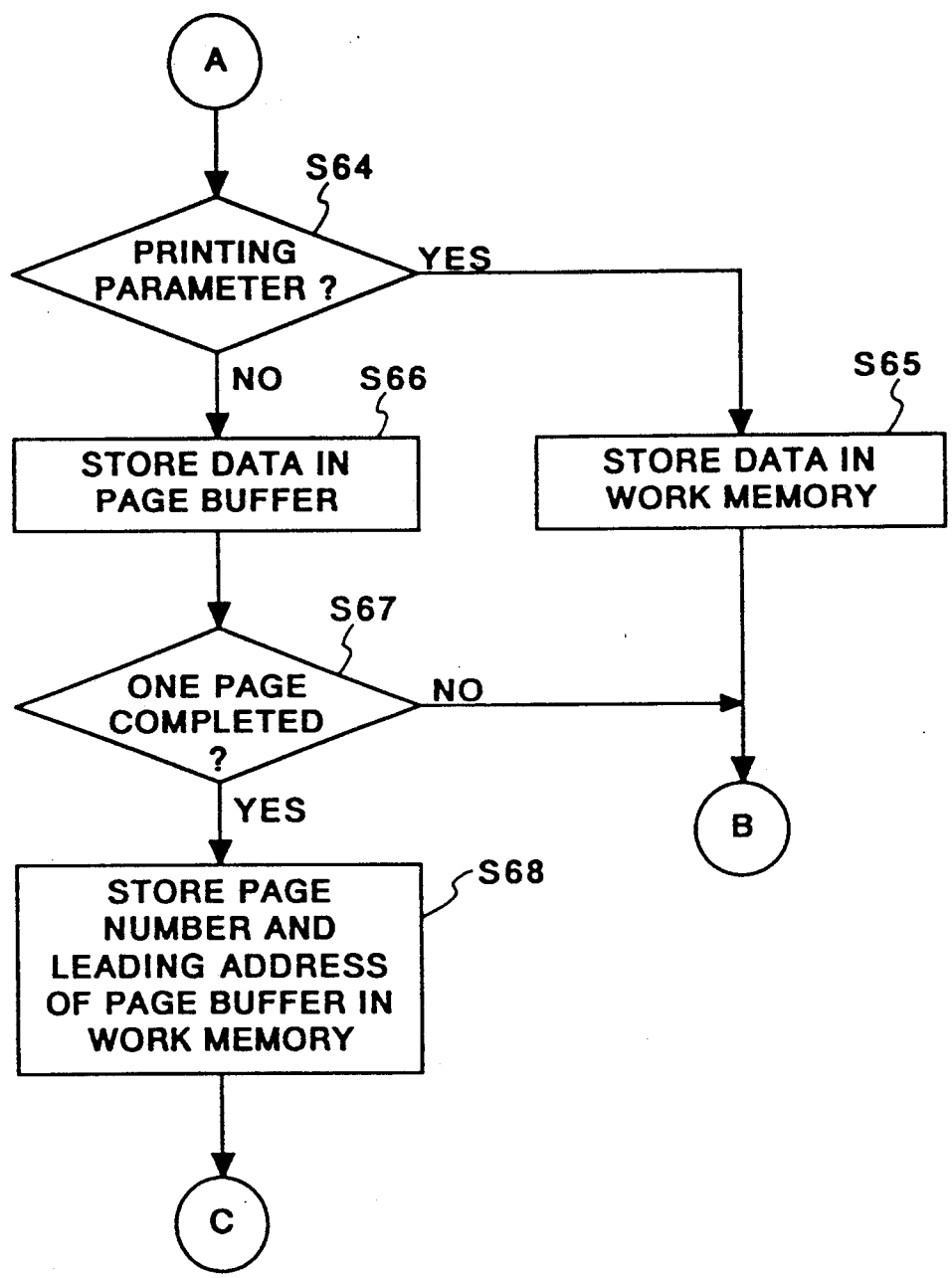
Figure 7C:
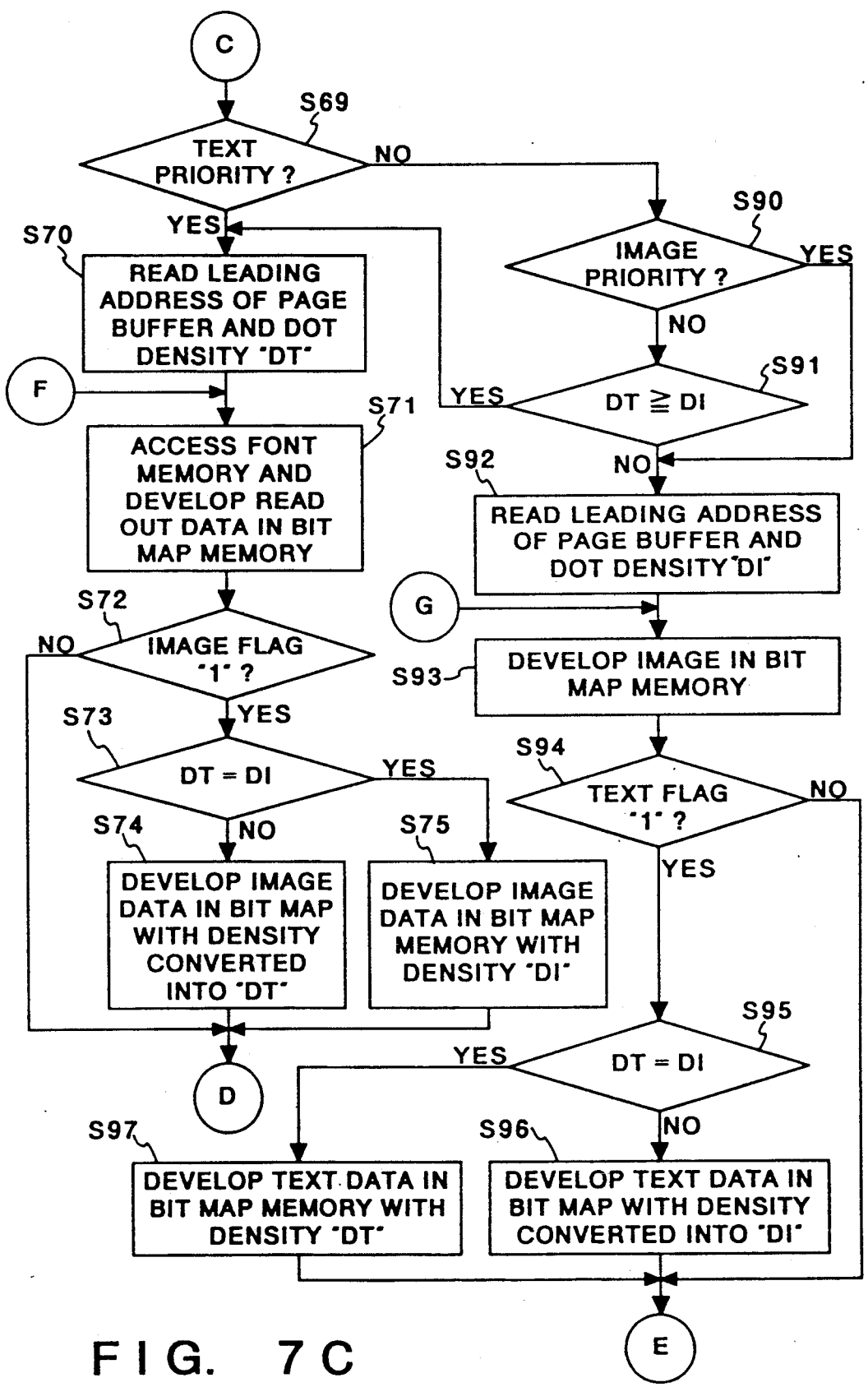
Figure 7D:
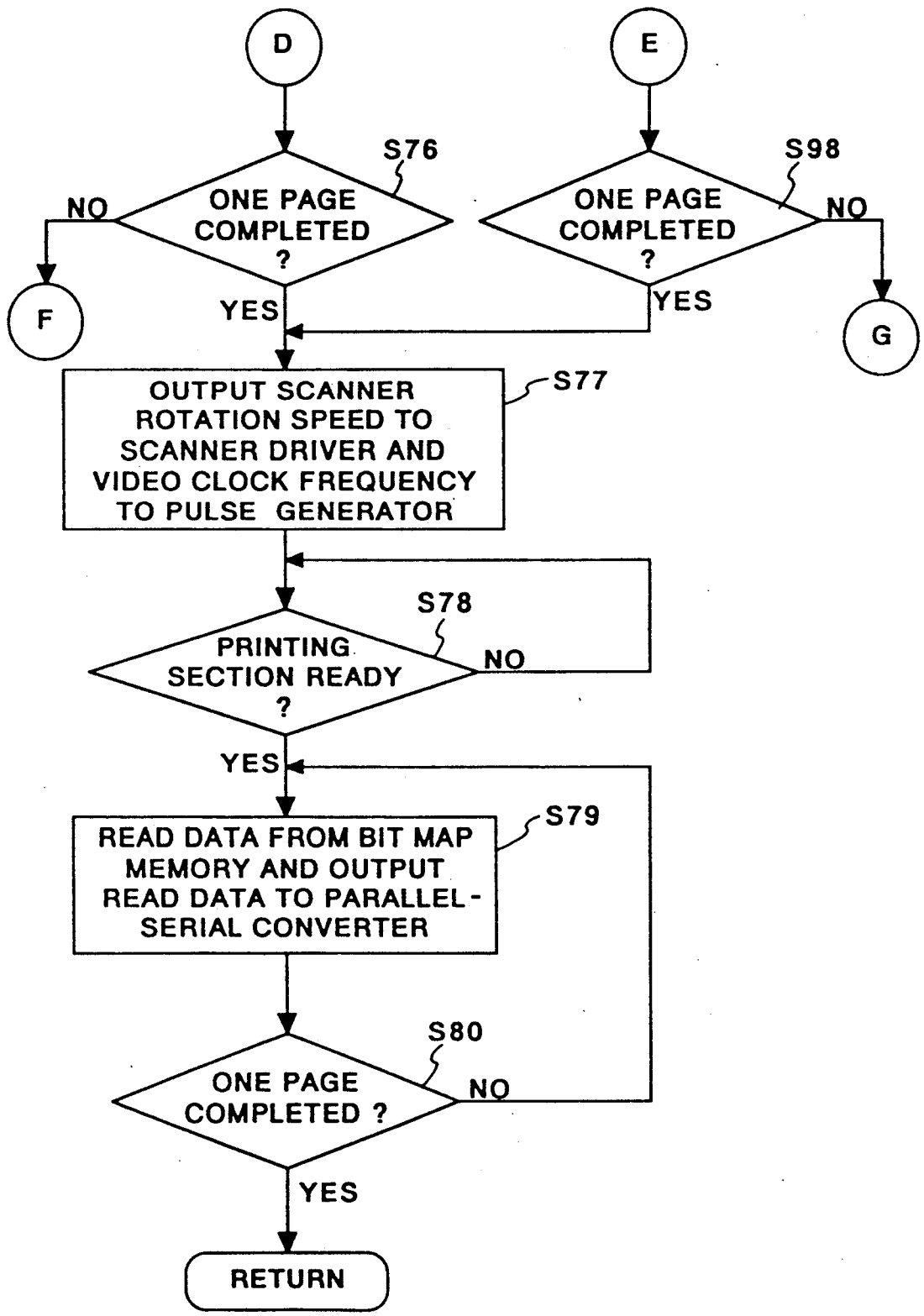

The procedure of data processing for enabling this effect will be described below on the basis of the flow charts of FIGS. 6A to 6C.

In step S21, determination is made as to whether or not an input data item is a command relating to the designation of resolution. In the case of YES, the process proceeds to step S22 and determination is made as to whether or not the command designates the resolution for image data. If it is determined that the command is not for image data or that the input data item is a command for designating the resolution for text data, the process proceeds to step S23 and the designated resolution DT, the rotational speed RT of the polygon mirror for realizing this resolution and the frequency fT of image clock are stored in the work memory 3.

If it is determined that the command relating to the designation of resolution is for image data, the process proceeds to step S24 and determination is made as to whether or not the designated resolution DI is equal to that of text data. In the case of NO, that is, the resolution designated for text data is higher, the process proceeds to step S25 and a flag provided at a predetermined address position of the work memory 3 is set to "1" and the resolution DI designated for text data is stored in the work memory 3. The initial value of this flag is "0".

If NO in step S21, that is, the data item is not any resolution designation data, the process proceeds to step S26 and determination is made as to whether or not the input data item is one of other printing parameters. If YES, the parameter is stored in the work memory 3 in step S27. If NO, the process proceeds to step S28 and the data item is stored in the page buffer 2. The part of the process corresponding to steps S21 to S29 is repeated until it is determined in step S29 that processing of data for one page is completed.

After image data and text data contained in printing data for one page has been stored in the page buffer 2 and after setting of each parameter has been completed, the process proceeds to step S30.

In step S30, various data items stored in the page buffer 2 are analyzed and restructured as page data, and the page number and the leading address of the page buffer are stored in the work memory 3. Thereafter, in step S31, the determined resolution DT and the previously stored address information are read. In step S32, text data items (character codes) are successively read from the position indicated by the read address information, character patterns based on the number of constituent dots according to the determined resolution and the designated character size are read out of the font memory and are developed in the bit map memory 5. If the read data item is an image data item, it is not used or processed, and the next data item is read.

The above-described character pattern development is repeated until it is determined in step S33 that the development of character patterns for one page is completed.

After character patterns based on text data for one page have been developed in the bit map memory 5, development of image data is performed.

In step S34, the leading address of the page buffer 2 and a designated resolution DI are read. In step S35, image data is read from the page buffer 2 at the position designated by the address, and determination is made in step S36 as to whether or not the flag is "1". If the flag is "1", the process proceeds to step S37 and interpolation (variable multiplication) is effected on the basis of the resolution DI designated for the read image data and the resolution DT of the text data so that the image data is multiplied by DT/DI. The process then proceeds to step S38 and the interpolated image data is developed in the bit map memory 5. If the flag is other than "1", interpolation of step S27 is not effected and the read image data is directly developed in the bit map memory 5 because the resolution designated for the image data and the resolution designated for the text data are equal to each other.

The part of the process corresponding to steps S35 to S39 is repeated until the completion of the development of all image data items is determined in step S39. If it is determined in step S35 that the read data item is a character code, it is not used or processed, and the next data item is read.

After character patterns in accordance with the text data and the image data have been developed in the bit map memory 5, the process proceeds to step S40. In step S40, RT is set in the scanner driver 10 while fT is set in the pulse generator, thereby enabling printing with the resolution of the text data. In step S41, a ready state of the printing section 7 is awaited in which printing with the resolution designated for the text data can be performed. Thereafter, in step S42, the contents of the bit map memory 5 are successively output to the parallel-serial converter 6, thereby executing printing. The operation of step S42 is executed until it is determined in step S43 that output of data for one page is completed.

The above-described process ensures that even if image data determining a resolution lower than the resolution designated for text data is received, the resulting image is not contracted while the qualities of the text print in accordance with the text data is maintained.

The above-described embodiment is based on the two different processes: one conducted in a case where the resolution of image data is higher than that of text data; and another conducted in a case where the resolution of image data is lower than that of text data are described. However, it is desirable to obtain good picture prints in either case in an integrated manner.

The system of the present invention is therefore made to operate in a way described below.

Basically, the printing resolution is adjusted to one of the designated resolutions higher than the other. In this case, however, the process is arranged to meet a demand for adjusting the printing resolution to resolution designated for text data or to the resolution designated for image data irrespective of the relationship between these designated resolutions.

That is, three modes for adjusting the resolution at the time of printing are provided which are a mode for adjusting the printing resolution to one of the designated resolutions higher than the other; a mode for forcibly adjusting the printing resolution to the resolution designated for text data; and a mode for forcibly adjusting the printing resolution to the resolution designated for image data. One of these modes is selected by a resolution priority command (one of three commands: a text priority command, an image priority command, and a density priority command) included in control information output from the host computer.

The procedure of a process conducted by the MPU 9 will be described below on the basis of flow charts of FIGS. 7A to 7D. A text priority command, an image priority command and a density priority command referred to in the following description are assumed to be contained in the work memory 3 with predetermined addresses.

In step S51, an input data item is read and determination is made as to whether or not the data item is a printing resolution priority command. If YES, determination is made in each of steps S52, S54 and S56 as to whether or not the command is a text priority command, an image priority command or a density priority command. If YES in one of these steps, the corresponding flag is set to "1" (steps S53, S55, S57). In the initial state, the density priority mode is selected.

If it is determined that the read data item is not any resolution priority command, the process proceeds to step S58 and determination is made as to whether or not the read data item is a resolution designation command. If NO, the process proceeds to step S64 explained later. If YES, the process proceeds to step S59.

In step S59, determination is made as to whether or not the command is a text resolution designation command. If YES, the process proceeds to step S60 and the text flag is set to "1". The process then proceeds to step S61 and the designated resolution DT and the corresponding RT and fT are stored in the work memory 3. If NO in step S59, that is, in the case of designation of resolution for image data, the process proceeds to step S62, and the image flag is set to "1". Then, in step S63, the resolution DI and the corresponding RI and fI are stored in the work memory 3.

If it is determined in step S58 that a data item other than the resolution designation command has been read, the process proceeds to step S64 and determination is made as to whether or not the data item is a printing parameter. If YES, the data item is stored in the work memory 3 (step S65. If NO, that is, the data item is recognized as a character code or image data, the process proceeds to step S66 and the data is restructured as page data while being analyzed, and is thereafter stored in the page buffer 2. The part of the process corresponding to steps S51 to S66 is repeated until it is determined in step S67 that data for one page has been stored.

After reception of data for one page has been completed, the process proceeds to step S68 and the page number of the data restructured as page data and the leading address of the page buffer are stored in the work memory 3. Then, in step S69, the work memory 3 is accessed and determination is made as to whether or not the text priority flag is "1".

If YES in step S69, printing is performed with the resolution DT designated by the command for designating the resolution for text data.

In this case, the leading address of the page buffer 2 and the resolution DT for the page to be printed stored in the work memory 3 are read in step S70. In step S71, character code data is read by using the address, and font patterns based on the corresponding number of constituent dots are read by accessing the font memory 4 and are developed in the bit map memory 5. At this case also, font patterns based on the corresponding number of constituent dots are selected by applying the designated resolution DT and the designated character size to the table shown in FIG. 3. The process then proceeds to step S72 and determination is made as to whether or not the image flag is "1". In the case of YES, the process proceeds to step S73 and determination is made as to whether or not the resolution DT designated for text data and the resolution DI designated for image data are equal to each other, because the received data contains image data. If these designated resolutions are not equal to each other, interpolation (or thinning-out) of image data according to the resolution DT designated for text data is effected in step S74. If these designated resolutions are equal to each other, the received image data is directly developed in the bit map memory in step S75, because there is not need for interpolation. The part of the process corresponding to steps S71 to S75 is repeated until it is determined in step S76 that the development of character patterns and image data for one page in the bit map memory 5 is completed.

If YES in step S76, it is determined that data (character patterns and image data) according to the resolution DT designated for text data has been developed in the bit map memory. That is, image data has undergone interpolation or thinning-out on condition that the resolution DI designated for image data is not equal to DT for text data. If NO in step S69, the process proceeds to step S90. At this time, the printing mode is one of the mode for forcibly setting the printing resolution to the resolution designated for image data and the mode for setting the printing resolution to one of the designated resolutions higher than the other.

In step S90, determination is made as to whether or not the image priority mode is selected, that is, whether or not the image priority flag is "1". In the case of image priority, the process proceeds to step S92 and a later-explained image priority processing is conducted. If it is determined that the image priority mode is not selected, that is, the density priority flag is "1", the process proceeds to step S91.

In step S91, the resolution DT designated for text data and the resolution DI designated for image data are compared with each other. If $DT \geq DI$ is thereby determined, the process proceeds to step S70 to execute the above text priority processing. If $DT < DI$ is determined, the image priority processing is executed, as described below.

In step S92, the leading address of the page buffer and the resolution DI designated for image data are read from the work memory 3. The process then proceeds to step S93 and image data is read from the position indicated by the address and is directly directly developed in the bit map memory at the designated position. In step S94, determination is made as to whether or not the text flag is "1", in other words, whether or not text data has been received. If NO, the process proceeds to step S98 or, if YES, the process proceeds to the next step S95. In this step, determination is made as to whether or not the resolution DT designated for text data and the resolution DI designated for image data are equal to each other. If DT=DI, the process proceeds to step S97 and character patterns in accordance with the text data are generated with the designated resolution and are developed in the bit map memory. If DT and DI are not equal to each other, the process proceeds to step S96 and the text data is developed in the bit map memory with the resolution DI of image data. At this time, the resolution DI and the designated size for each character is applied to the table of FIG. 3, and the character patterns based on the number of constituent dots thereby determined are developed in the bit map memory 5.

The part of the process corresponding to steps S93 to S98 is repeated until the completion of data development for one page is determined in step S98.

If it is determined in step S76 or S98 that the data development in the bit map memory 5 is completed, the process proceeds to step S77. In this step, the determined rotational speed of the scanner motor 13 is set in the scanner driver 10 and the frequency of video clock is set in the pulse generator 9. However, in the case where the preceding step is step S76, the rotational speed and the frequency to be set are RT and fT. In the case where the preceding step is step S98, the values to be set are RI and fI.

Thereafter, in step S78, reception of the ready signal from the printing section 7 is awaited. When the ready signal is received, image data items developed in the bit map memory are successively read to the parallel-serial converter 6 and are output as image signals to the laser driver 11, in step S79. This image signal output operation is repeated until it is determined in step S80 that image signals for one page has been output.

As described above, it is possible to reproduce a good synthesized image irrespective of whether or not one of the resolution designated for image data and the resolution designated for text data is higher or lower than the other.

Incidentally, in a case where printing of characters of different character sizes are printed while the resolution is constantly maintained, the number of constituent dots for forming a smaller character is reduced. In consequence, if a smaller and complicated character is printed, the character is necessarily deformed, resulting in a reduction in the qualities of the print.

In this embodiment, if an instruction to print characters smaller than a certain size is issued, character patterns based on a larger number of constituent dots are used and the resolution at the time of printing is correspondingly increased, thereby avoiding the problem of a reduction in the qualities of the print of a smaller character.

Figure 8A:
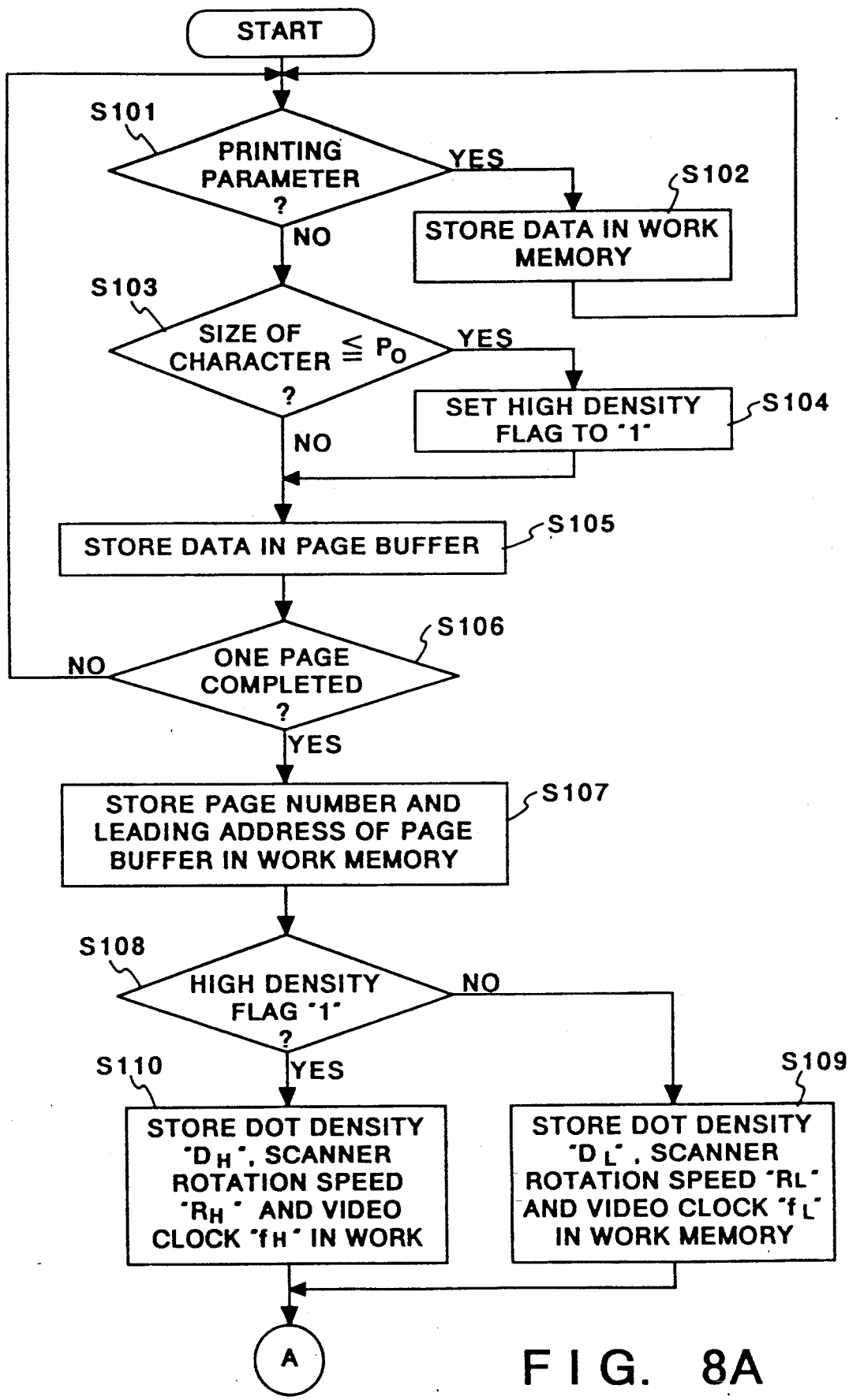
FIGS. 8A and 8B are flow charts of the procedure of a process for preventing deterioration of the qualities of the print when a smaller character is printed.
Figure 8B:
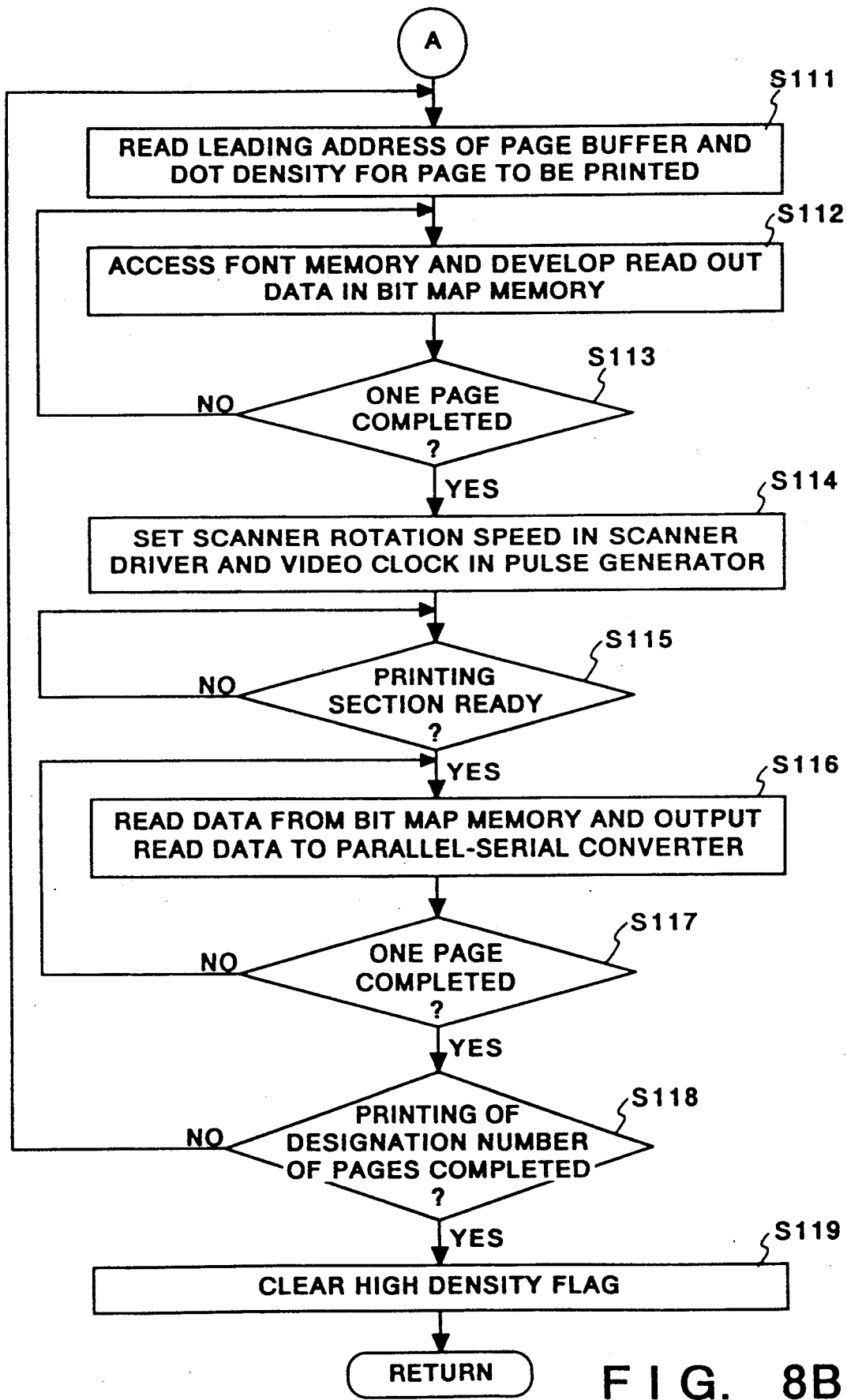

The procedure of a process arranged to achieve this effect will be described below on the basis of the flow charts of FIGS. 8A and 8B.

To simplify the description, it is assumed that the resolution of the system at the initial stage is $D_L$ and that if a character size equal to or smaller than P is designated, the character is deformed while this resolution is maintained. The process will be described below with respect to a case where printing is effected with a resolution $D_H$ in such an event. It is also assumed that data on the reference character size Po is stored and maintained in the program memory 9a while a high density flag is maintained in the work memory 3 with a predetermined address.

In step S101, determination is made as to whether or not an input data is a printing parameter. If YES, the process proceeds to step S102 and the parameter is stored in the work memory 3. If NO in step S101, that is, it is determined that the input data item is character data (character code), the process proceeds to step S103 and determination is made as to whether or not the size of the character is equal to or smaller than the reference character size Po. If it is determined that the size of the present character is equal to or smaller than the reference character size Po, the process proceeds to step S104 and the high density flag is set to "1". If NO, in step S103, or after the execution of step S104, the character data is stored in the page buffer 2 in step S105. The part of the process corresponding to steps S101 to S105 is repeated until it is determined in step S106 that reception of data for one page is completed.

After data for one page has been stored in the page buffer 2, the various items of stored data are restructured as page data while analyzed, and the page number and the leading address of the page buffer are stored in the work memory 3. Thereafter, in step S108, determination is made as to whether or not the high density flag is "1". If YES, that is, it is determined that there is a risk of deformation of the character, the process proceeds to step S110 and a resolution $D_H$ and a corresponding rotational speed $R_H$ of the scanner motor and a corresponding frequency $f_H$ of video clock are stored in the work memory 3. If NO, the process proceeds to step S109 and a resolution $D_L$ and a corresponding scanner rotation speed $R_L$ and a corresponding frequency $f_L$ of video clock are stored in the work memory 3. The process then proceeds to step S111, the leading address of the page buffer 2 and the resolution for the present page are read by accessing the work memory 3. In step S112, character code data is read from the position designated by the read address, character patterns based on the corresponding number of constituent dots are generated by the font memory 4 according to the size designated for the character codes and are developed in the bit map memory 5. The number of constituent dots of each generated character pattern is known by referring to the table of FIG. 3. The operation of step S112 is repeated until it is determined that the development of character patterns for one page is completed.

If it is determined in step S113 that the development of character patterns is completed, the process proceeds to step S114. In this step, the scanner rotation speed R and the video clock frequency f previously determined are set in the scanner driver 10 and the pulse generator, respectively. If it is determined in step S115 that the printing section 7 is ready to print, the process proceeds to step S116 and the contents of the bit map memory 5 are read and successively output to the parallel-serial converter 6, thereby executing printing. If the completion of data output for one page is determined in step S117, the process proceeds to step S118 and determination is made as to whether or not printing of a set number of pages. If NO, the process returns to step S111. IF YES, the process proceeds to step S119 to clear the high density flag and then returns to the main routine (not shown).

As described above, it is possible to maintain the desired qualities of printed characters even if the size of the characters is equal to or smaller than the reference character size, that is, if there is a risk of deformation of each printed character.

In the description of the embodiment, the reference character size Po is fixed. However, it may be used as a variable factor. For example, it may be freely changed by a control command from the host unit or by means of a control panel (not shown) of the printer.

The above process has been described with respect to text data alone but it can be of course applied to a case where image data is also contained in the data for printing the same page. For example, if the high density flag is fixed to "0", the resolution at the time of printing may be set to the higher one of the two resolutions designated for text data and image data. If the high density flag is set to "1", printing may be performed with the higher one of the resolution $D_H$ newly set for text data and the resolution designated for image data.

Since the reference character size varies according to changes in the resolution, different reference character sizes are stored as a table for degrees of resolution. The resolution $D_H$ changed after the high density flag has been set to "1" may be fixedly set to the maximum resolution of the printer. Also, a table for obtaining the optimum resolution from each designated resolution and each designated character size may be prepared and the optimum resolution $D_H$ may be determined by referring to this table. In this case, the optimum resolution are determined in such a manner that the lowest of a range of resolution in which occurrence of character deformation is prevented is selected. This is because, if the resolution is excessively high, the number of constituent dots of generated character patterns is relatively increased, and the time taken to develop data for one page in the page buffer 2 becomes longer.

In the above-described embodiment, the font memory 4 stores a plurality of character patterns based on different numbers of constituent dots, but the present invention is not limited to this arrangement. For example, if outline fonts (vector fonts) which have recently come into notice are adopted, only one type of font will suffice for all the character patterns and enable a reduction in the memory capacity.

In the above-described embodiment, the printing section has a printing mechanism wherein a laser beam modulated on the basis of image signals by the polygon mirror 14 rotated by the scanner motor 13 is used for imaging on the photosensitive member 15. However, the structure for recording images may be of any other type. For example, the present invention can be applied to a type of optical printer utilizing an LED array or a liquid crystal shutter in a similar manner. That is, in the case of an LED printer utilizing an LED array, LEDs are arranged at intervals in the main scanning direction according to the resolution. If resolutions $D_1$ to $D_3$ are needed, three types of LED arrays are disposed around the photosensitive member, and one of them is selected to change the resolution with respect to the main scanning direction as desired. To change the resolution with respect to the sub scanning direction, time intervals at which the LED array for one line is lit up are varied (which are determined from the rotational speed and the resolution of the photosensitive drum).

With respect to the main scanning direction, instead of converting the video signal into a serial signal, data items read from the bit map memory 4 are successively latched in a register corresponding to an element of LED array for one line, and the LED array is lit up when latching of data for one line is completed. At this time, data for one line must be transmitted to the LED array element for one line.

As many apparently widely different embodiments of the present invention can be made without departing from the spirit and scope thereof, it is to be understood that the invention is not limited to the specific embodiments thereof except as defined in the appended claims.

What is claimed is:

1. A printing controller for controlling a printer capable of performing a printing operation in one of a plurality of printing resolutions, said controller comprising:
    input means for inputting printing information containing at least a character symbol code and image data;
    pattern generating means for generating a character symbol pattern corresponding to the character symbol code;
    resolution setting means for setting the printing resolution of said printer; and
    output means for outputting the character symbol pattern generated by said pattern generating means and the image data input through said input means as an image signal to said printer;
    wherein when a first resolution at which the image data is to be printed is higher than a second resolution at which the character symbol pattern corresponding to the character symbol code is to be printed, said pattern generating means generates the character symbol pattern as consisting of numbers of constituent dots corresponding to said first resolution, said resolution setting means sets the first resolution as the printing resolution of said printer.

2. A printing controller according to claim 1, wherein said pattern generating means includes a font memory in which character symbol patterns based on different numbers of constituent dots are stored.

3. A printing controller according to claim 1, wherein said pattern generating means is an outline font generating means.

4. A printing controller according to claim 1, wherein said printer is a laser beam printer, and wherein the scanning speed of the laser beam and the speed at which the image signal is transmitted are controlled to achieve the printing resolution set by the resolution setting means.

5. A printing controller according to claim 1, wherein said input means further inputs control information and data specifying said first resolution and data specifying said second resolution are contained in the control information which is input through said input means.

6. A printing controller according to claim 1, further comprising:
  memory means in which data of images for one page can be developed; and
  development means for developing, in said memory means, the character symbol pattern generated by said pattern generating means and the image data input through said input means;
  wherein said output means outputs, as the image signal, data developed in the memory means to said printer.

7. A printing controller according to claim 1, further comprising a table for obtaining the number of constituent dots determined on the basis of the printing resolution and the designated character size, wherein said table is referred to determine the number of constituent dots of the character symbol pattern to be generated.

8. A printing controller for controlling a printer capable of performing a printing operation in one of a plurality of printing resolutions, said controller comprising:
  input means for inputting printing information containing at least a character symbol code and image data;
  pattern generating means for generating character symbol pattern corresponding to the character symbol code;
  interpolation means for interpolating the input image data;
  resolution setting means for setting said printing resolution of the printer; and
  output means for outputting the character symbol pattern and the image data as an image signal;
  wherein when a first resolution at which the input image data is to be printed is lower than a second resolution at which the character symbol pattern corresponding to the character symbol code is to be printed, said interpolation means interpolates the input image data on the basis of the first and second resolutions, said resolution setting means sets the second resolution as the printing resolution, and said output means outputs the image data interpolated by said interpolation means and the character symbol pattern generated by said pattern generating means to said printer.

9. A printing controller according to claim 8, wherein said pattern generating means includes a font ROM in which character symbol patterns based on different numbers of constituent dots are stored.

10. A printing controller according to claim 8, wherein said pattern generating means is an outline font generating means.

11. A printing controller according to claim 8, wherein said printer is a laser beam printer, and wherein the scanning speed of the laser beam and the speed at which the image signal is transmitted are controlled to achieve the printing resolution set by the resolution setting means.

12. A printing controller according to claim 8, wherein said input means further inputs control information and data specifying said first resolution and data specifying said second resolution are contained in the control information which is input through said input means.

13. A printing controller according to claim 8, further comprising:
  memory means in which data of images for one page can be developed; and
  development means for developing, in said memory means, the character symbol pattern generated by said pattern generating means and the image data input through said input means;
  wherein said output means outputs, as the image signal, data developed in the memory means to said printer.

14. A printing controller for controlling a printer capable of performing a printing operation in one of a plurality of printing resolutions, said controller comprising:
  input means for inputting printing information containing at least a character symbol code and image data;
  pattern generating means for generating a character symbol pattern corresponding to the character symbol code;
  comparison means for comparing a first resolution at which the image data is to be printed with a second resolution at which the character symbol pattern corresponding to the character symbol code is to be printed;
  interpolation means for interpolating the image data on the basis of the first and second resolutions;
  resolution setting means for setting the printing resolution of said printer in accordance with one of the first and second resolutions recognized by said comparison means to be higher;
  first output means for outputting, as an image signal, the image data input through said input means and the character symbol pattern generated by said pattern generating means to said printer in which the printing resolution is set by said resolution setting means;
  second output means for outputting, as the image signal, the character symbol pattern generated by said pattern generating means and the image data interpolated by said interpolation means to said printer in which the printing resolution is set by said resolution setting means; and
  selecting means for selecting one of said first and second output means on the basis of the result of comparison effected by said comparison means.

15. A printing controller according to claim 14, wherein said pattern generating means includes a font memory in which character symbol patterns based on different numbers of constituent dots are stored.

16. A printing controller according to claim 14, wherein said pattern generating means is an outline font generating means.

17. A printing controller according to claim 14, wherein said printer is a laser beam printer and said resolution setting means sets the scanning speed of the laser beam and the speed at which the image signal is transmitted.

18. A printing controller according to claim 14, wherein the printing information further includes control information and data specifying said first resolution and data specifying said second resolution are contained in the control information which is input through said input means.

19. A printing controller according to claim 14, further comprising a table for obtaining the number of constituent dots determined on the basis of the printing resolution and the designated character size, wherein said table is referred to determine the number of constituent dots of the character symbol pattern to be generated.

20. A printing controller for controlling a printer capable of performing a printing operation at one of a plurality of printing resolutions, said controller comprising:
- input means for inputting at least a character code;
- pattern generating means for generating a character symbol pattern corresponding to the character code, said pattern generating means being capable of generating a plurality of character symbol patterns corresponding to one character code, each character symbol pattern being based on different numbers of constituent dots;
- designating means for designating the size of the character symbol pattern to be printed;
- resolution setting means for setting the printing resolution of said printer; and
- output means for outputting the character symbol pattern generated by said pattern generating means to said printer;
- wherein if the size designated for the character code input through said input means is smaller than a predetermined size, which is dependent upon one of the plurality of printing resolutions, said resolution setting means sets the printing resolution higher than the designated printing resolution and said pattern generating means generates a character symbol pattern based on the number of constituent dots according to the printing resolution set by said resolution setting means and the designated size.

21. A printing controller according to claim 20, further comprising a table for obtaining the number of constituent dots determined on the basis of the printing resolution and the designated character size, wherein said table to determine the number of constituent dots of the character symbol pattern to be generated.

22. A printing controller according to claim 20, further comprising a table showing the relationship between the designated character size with respect to each of the plurality of printing resolutions and the increased printing resolution to be set by the resolution setting means.

23. A printer controller for a printer, said controller comprising:
- input means for inputting a character code and image data;
- resolution setting means for setting the printing resolution of the printer; and
- designating means for designating a first resolution in which the input image data is to be printed and a second resolution in which a character pattern corresponding to the input character code is to be printed;
- wherein said resolution setting means sets one of the first and second resolutions as the printing resolution.

24. A printing controller according to claim 23, wherein said resolution setting means selectively sets, as the printing resolution, the higher of the first and second resolutions.

25. A printing controller according to claim 23, further comprising image data processing means for processing the input image data,
wherein when said resolution setting means sets the second resolution as the printing resolution, the image data processed by the image data processing means is output to the printer.

26. A printing controller according to claim 23, wherein when said resolution setting means sets the first resolution as the printing resolution, the character symbol pattern, having a number of constituent dots, which corresponds to the first resolution, is output to the printer.

* * * * *